(12) United States Patent
Brett et al.

(10) Patent No.: US 11,294,709 B2
(45) Date of Patent: Apr. 5, 2022

(54) SYSTEM AND METHOD OF OBTAINING MULTIPLE FACTOR PERFORMANCE GAIN IN PROCESSING SYSTEM

(71) Applicant: NXP USA, Inc., Austin, TX (US)

(72) Inventors: Maik Brett, Taufkirchen (DE);
Sidhartha Taneja, New Delhi (IN);
Christian Tuschen, Holzkirchen (DE);
Tejbal Prasad, Greater Noida (IN);
Nikhil Tiwari, Palam Colony (IN);
Saurabh Arora, Ghaziabad (IN)

(73) Assignee: NXP USA, Inc., Austin, TX (US)

( * ) Notice: Subject to any disclaimer, the term of this patent is extended or adjusted under 35 U.S.C. 154(b) by 135 days.

(21) Appl. No.: 16/793,954

(22) Filed: Feb. 18, 2020

(65) Prior Publication Data
US 2021/0255892 A1    Aug. 19, 2021

(51) Int. Cl.
*G06F 9/50*    (2006.01)
*G06F 9/30*    (2018.01)
(Continued)

(52) U.S. Cl.
CPC ........ *G06F 9/4843* (2013.01); *G06F 9/30087* (2013.01); *G06F 9/3836* (2013.01); *G06F 9/5027* (2013.01); *G06F 12/06* (2013.01)

(58) Field of Classification Search
CPC .............. G06F 9/30087; G06F 9/3836; G06F 9/5027
See application file for complete search history.

(56) References Cited

U.S. PATENT DOCUMENTS 5,036,453 A * 7/1991 Renner ............... G06F 15/8015
                                                                 712/16
7,321,965 B2    1/2008 Kissell
(Continued)

FOREIGN PATENT DOCUMENTS

EP    1658563 B1    6/2013

OTHER PUBLICATIONS

"OpenMP—Shared Memory and Device Parallelism." Published by Leibniz-Rechenzentrum at https://www.trz.de/services/.+shared+memory+and+device+parallelism on Feb. 17, 2020. pp. 1-11.
(Continued)

*Primary Examiner* — Zachary K Huson (57) ABSTRACT

A processing system including a memory, command sequencers, accelerators, and memory banks. The memory stores program code including instruction threads sequentially listed in the program code. The command sequencers include a master command sequencer and multiple slave command sequencers. The master command sequencer executes the program code including distributing the instruction threads for parallel execution among the slave command sequencers. The instruction threads may be provided inline or accessed via inline thread line pointers. Each accelerator is available to each command sequencer in which multiple command sequencers may access multiple accelerators for parallel execution. The memory banks are simultaneously available to multiple accelerators. The master command sequencer may perform implicit synchronization by waiting for completion of simultaneous execution of multiple instruction threads. A command sequencer arbiter may arbitrate among the command sequencers. A memory bank arbiter may arbitrate among the accelerators for accessing the memory banks.

23 Claims, 9 Drawing Sheets

(51) Int. Cl.
*G06F 9/38* (2018.01)
*G06F 9/48* (2006.01)
*G06F 12/06* (2006.01)

(56) References Cited

U.S. PATENT DOCUMENTS 7,660,969 B2 2/2010 Jensen et al.
2020/0371856 A1* 11/2020 Zhang ................. G06F 11/0709
2021/0064378 A1* 3/2021 Al Sheikh ............. G06F 9/3846

OTHER PUBLICATIONS

U.S. Appl. No. 17/103,000, Brett, Maik et al.: "Generating Source and Destination Addresses for Repeated Accelerator Instruction", filed Nov. 24, 2020.

* cited by examiner

SYSTEM AND METHOD OF OBTAINING MULTIPLE FACTOR PERFORMANCE GAIN IN PROCESSING SYSTEM

BACKGROUND

Field of the Invention

The present invention relates in general to processing systems, and more particularly to a processing system that enables parallel multiple thread processing and that includes multiple command sequencers, multiple accelerators and multiple memory banks.

Description of the Related Art

It is desired to achieve a multi-fold performance gain in processing systems used for certain applications. One such application is a next generation radar preprocessing engine, such as may be used in an advanced driver-assistance system (ADAS) and the like. A three-fold factor may be obtained in a conventional processing architecture by increasing the frequency of operation. Another two-fold factor may be achieved by increasing 8-way execution to 16-way execution. Market requirements for some applications, however, dictate an even greater performance increase than the conventional processing architectures are able to provide.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

The inventors have recognized the need to achieve a multi-fold performance gain in processing systems for certain applications, such as a next generation radar preprocessing engine which may be used in an advanced driver-assistance system (ADAS) or the like. They have therefore developed a processing system which includes multiple command sequencers, multiple accelerators and multiple memory banks and that enables parallel multiple thread processing to obtain greater performance gain than is possible with conventional processing architectures.

Figure 1:
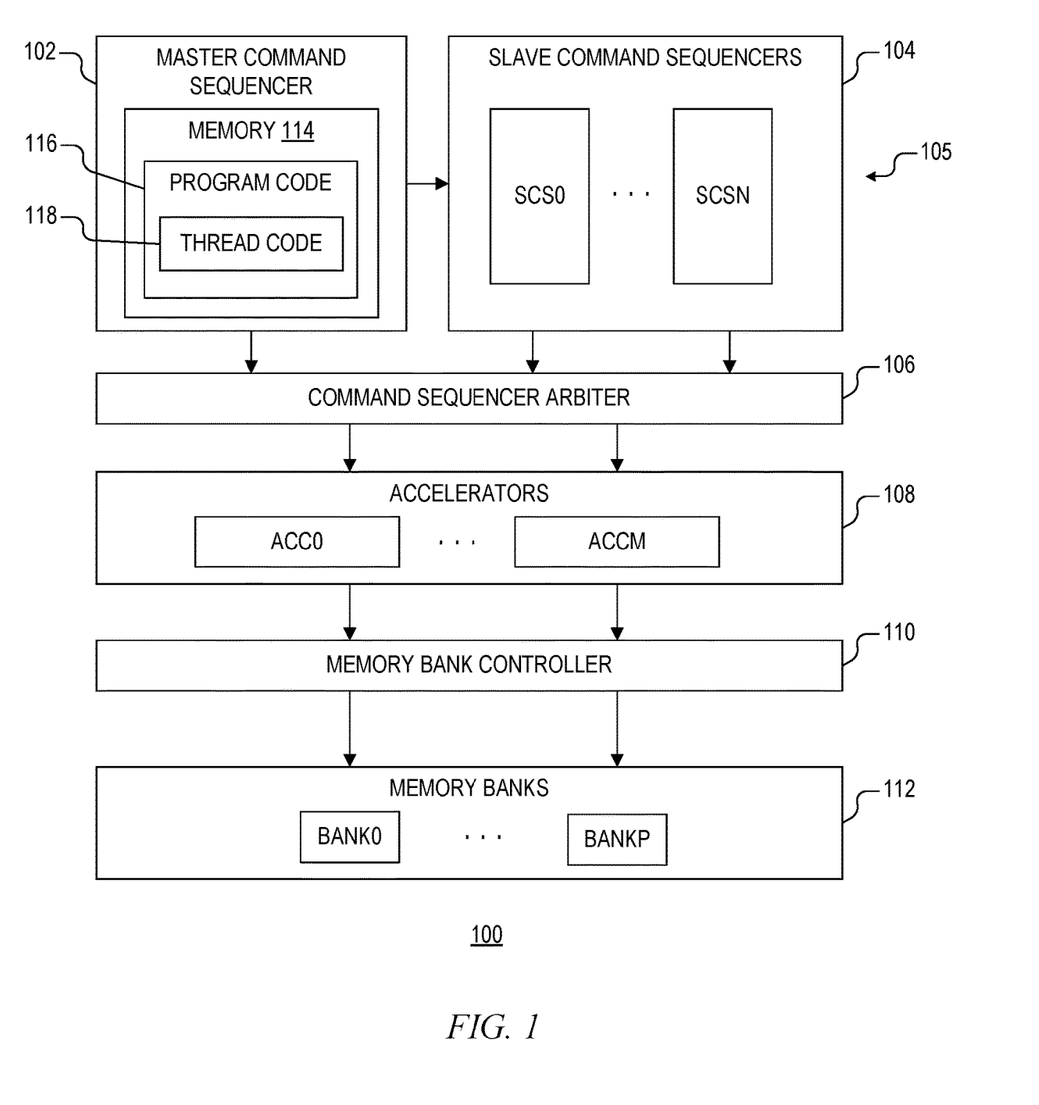
FIG. 1 is a simplified block diagram of a multiple command sequencer processing system implemented according to one embodiment of the present disclosure.

FIG. 1 is a simplified block diagram of a multiple command sequencer processing system 100 implemented according to one embodiment of the present disclosure. The multiple command sequencer processing system 100 includes a master command sequencer (MCS) 102, multiple slave command sequencers (SCS) 104, a command sequencer arbiter 106, multiple accelerators 108, a memory bank controller 110, and multiple memory banks 112. The MCS 102 includes or otherwise accesses memory 114 which further stores program code 116. The program code 116 may further include thread code 118, or the thread code 118 may be provided at a different location in the memory 114. The MCS 102 and the SCSs 104 are collectively referred to herein as the command sequencers 105.

Although the memory 114 is shown as part of the MCS 102, it may typically include any suitable combination of separate read-access memory (RAM) and read-only memory (ROM) devices accessible by the MCS 102, which loads and executes the program code 116. The program code 116 may be in the form of an application program or firmware or the like. The thread code 118 may be separate from the program code 116, or may be provided inline within the program code 116, or a combination of both.

The program code 116 and the thread code 118 each include program instructions which include complex functional instructions for performing complex functions including complex mathematical operations. The complex mathematical operations may include performing complex local or global maximum operations on a set of alphanumeric values including number arrays or matrices, histogram calculations, sorting functions or the like on a large set of complex values, Fast Fourier Transform (FFT) and inverse FFT (IFFT) transformations between time and frequency domains, etc.

The SCSs 104 include a set of N+1 slave command sequencers individually labeled SCS0, . . . , SCSN (SCS0-SCSN), in which N is any suitable integer value depending upon the maximum number of program threads to be executed in parallel. As described further herein, the thread code 118 may include multiple thread instruction sets in which each thread instruction set includes at least one instruction. The MCS 102 may distribute multiple thread instruction sets among the SCSs 104 for parallel execution.

The accelerators 108 include a set of M+1 accelerators individually labeled ACC0, . . . , ACCM (ACC0-ACCM), in which M is any suitable integer value. The accelerators 108 are shared among the command sequencers 105 in which any functional command sequencer 105 may request and be granted access to any one of the accelerators 108. In one embodiment, M+1 is greater than or equal to N+2 so that each of the command sequencers 105 may link and access a corresponding one of the accelerators 108 at the same time. The command sequencer arbiter 106 performs arbitration among multiple requests from the command sequencers 105, and also establishes a connection between each command sequencer 105 submitting a request and a corresponding one of the accelerators 108 based on the results of arbitration. In one embodiment, the command sequencer arbiter 106 includes a switch matrix that enables each of multiple command sequencers 105 to simultaneously connect to a corresponding one of multiple accelerators 108. In one embodiment, the command sequencer arbiter 106 includes multiple multiplexors that enable each of multiple command sequencers 105 to simultaneously connect to a corresponding one of the accelerators 108. For example, a multiplexor may be provided for each of the accelerators 108, in which each multiplexor connects a selected one of the command sequencers 105 to a corresponding one of the accelerators 108.

The accelerators 108 are heterogenous specialized hardware accelerators in which each is configured to execute an instruction for performing a corresponding complex operation as managed by the corresponding command sequencers 105. For example, one or more of the accelerators 108 may be configured to perform histogram operations, FFT and IFFT operations, vector operations, complex numeric comparing and sorting algorithms and the like, digital signal processing (DSP) functions, etc.

The memory banks 112 include a set of P+1 separate memory banks individually labeled BANK0, . . . , BANKP, in which P is any suitable integer value. The memory banks 112 form a protected shared memory system to support simultaneous read and write from the M+1 accelerators 108 which can be running up to M+1 thread instruction sets. The memory banks BANK0-BANKP are shared among the accelerators ACC0-ACCM in which any accelerator may access any one of the memory banks 112. In one embodiment, P+1 is greater than or equal to 2(M+1) for simultaneous read and write access for each of the accelerators 108. The memory bank controller 110 performs arbitration among multiple requests from the accelerators 108, and also establishes a connection between each accelerator 108 submitting a request and a corresponding one or more of the memory banks 112 based on the results of arbitration. In one embodiment, the memory bank controller 110 includes a switch matrix that enables each of the accelerators to simultaneously connect to at least one of memory banks 112. In one embodiment, the memory bank controller 110 includes multiple multiplexors that enable each of accelerators 108 to simultaneously connect to a corresponding one or more of the memory banks 112. For example, at least one multiplexor may be provided for each of the memory banks 112, in which each multiplexor connects a selected one of the accelerators 108 to a corresponding one or more of the memory banks 112.

Logical to physical mapping of each address is based on thread context. In one embodiment, only limited operands of L kilobytes (KB) are addressable through logical address space, but may address a much larger physical memory space LxR KB to support effective multi-threading. R is any suitable number to support multi-threading; in one embodiment, R=4. As described further herein, the multiple command sequencer processing system 100 supports synchronized functionality between multiple thread instruction sets which enables a thread instruction set to wait until another thread instruction set reaches a specific point in code or to wait until a specific thread instruction set or combination of thread instruction sets completes.

Figure 2:
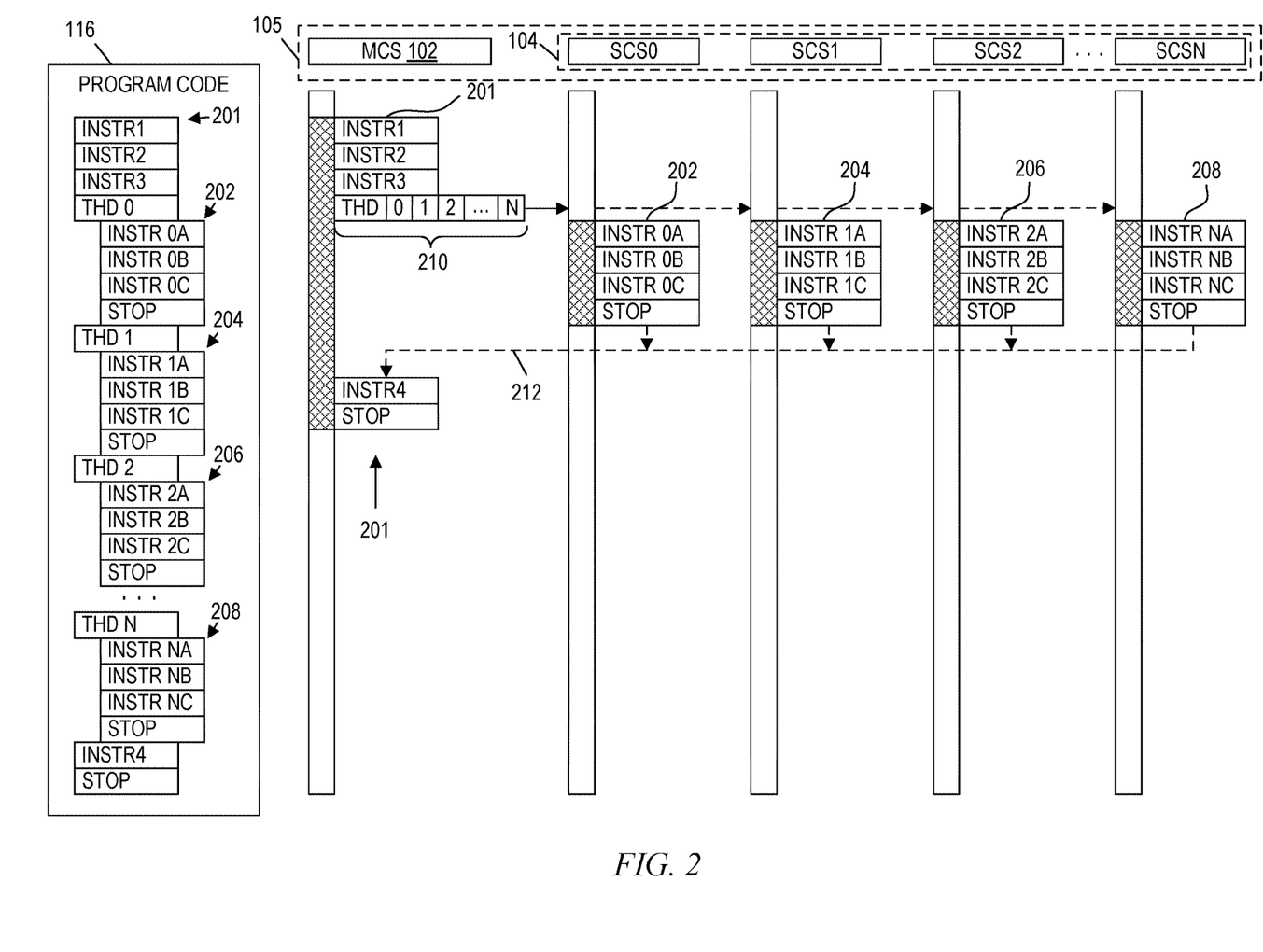
FIG. 2 is an illustration of program code including one or more inline thread instruction sets according to one embodiment of the present disclosure.

FIG. 2 is an illustration of program code 116 including one or more inline thread instruction sets according to one embodiment of the present disclosure. The program code 116 includes an instruction set 201 including a set of instructions (INSTR) 1, 2, 3, and 4 followed by a STOP instruction. Interposed inline between instructions 3 and 4 are multiple thread instruction sets (or threads) 202, 204, 206, . . . , 208 (202-208). The thread 202 with thread identifier (ID) THD 0 includes instructions 0A, 0B, and 0C followed by a STOP instruction. The thread 204 with thread ID THD 1 includes instructions 1A, 1B, and 1C followed by a STOP instruction. The thread 206 with thread ID THD 2 includes instructions 2A, 2B, and 2C followed by a STOP instruction. The thread 208 with thread ID THD N includes instructions NA, NB, and NC followed by a STOP instruction. Although only 4 separate thread instruction sets are shown, it is understood that any number of threads may be included in which up to N+1 threads, identified as thread IDs THD 0, 1, 2, . . . , N (THD 0-THD N), may be executed simultaneously. Also, although each thread is shown including 3 instructions each, it is understood that each thread may include any number of instructions more or less than three instructions.

The threads THD 0-THD N are replaced within the program code 102 of the MCS 102 with corresponding thread links 210. Thread 202 is transferred (or copied) to the slave command sequencer SCS0, thread 204 is transferred (or copied) to the slave command sequencer SCS1, thread 206 is transferred (or copied) to the slave command sequencer SCS2, and so on up to the last thread 208, which is transferred (or copied) to the slave command sequencer SCSN as shown. Although not shown, additional threads may be included, such as THD 3 transferred (or copied) to SCS3, THD 4 transferred (or copied) to SCS4, and so on up to N+1 separate threads.

The MCS 102 executes the instructions 1, 2, and 3 in order, and then, when it encounters the thread links 210, it prompts the slave command sequencers SCS0-SCSN to begin executing the corresponding threads THD 0-THD N in parallel. The MCS 102 waits until all of the active threads are completed before executing the last instruction 4 before stopping. This is depicted as an implicit synchronization arrow 212.

Figure 3:
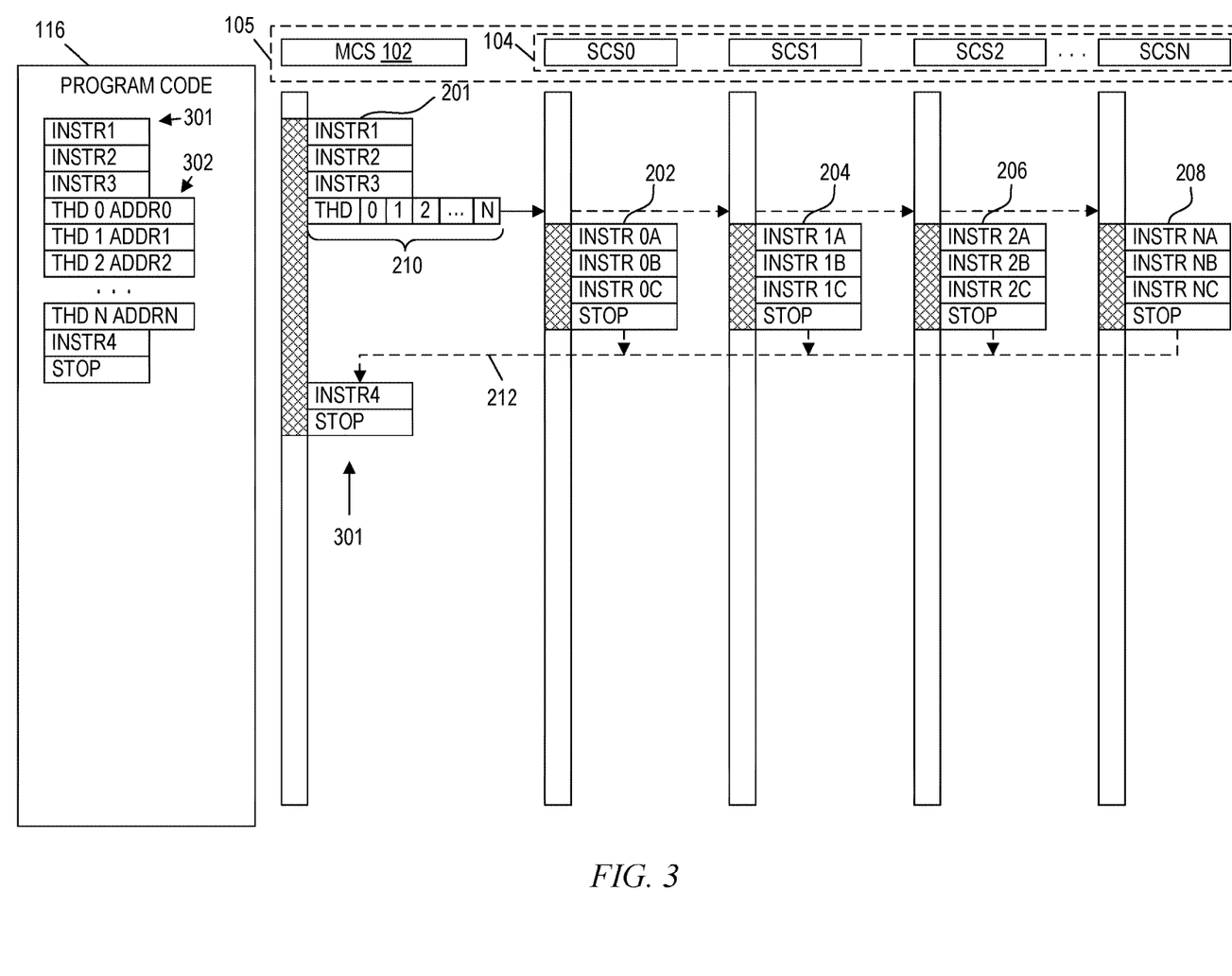
FIG. 3 is an illustration of program code including pointers to one or more thread instruction sets according to another embodiment of the present disclosure.

FIG. 3 is an illustration of program code 116 including pointers to one or more thread instruction sets according to another embodiment of the present disclosure. The program code 116 includes an instruction set 301 including the set of instructions 1, 2, 3, and 4 followed by a STOP instruction in a similar manner as previously described for FIG. 2. In this case, interposed between instructions 3 and 4 are multiple thread pointers 302 each pointing to a corresponding one of the same threads 206-208 previously described. Again, only 4 separate threads are shown where it is understood that any number of thread instruction sets may be included in which up to N+1 threads, such as THD 0-N, may be executed simultaneously. The thread pointers 302 includes a pointer to thread 202 (THD 0) at an address ADDR0, a pointer to thread 204 (THD 1) at an address ADDR1, a pointer to thread 206 (THD 2) at an address ADDR2, and so on up to a pointer to thread 208 (THD N) at an address ADDRN.

The thread pointers 302 are replaced within the program code 102 of the MCS 102 with the corresponding thread links 210. The threads 202-208 are accessed within the thread code 118 portion of the program code 102 and transferred (or copied) to corresponding slave command sequencers 104. As before, thread 202 is transferred (or copied) to the slave command sequencer SCS0, thread 204 is transferred (or copied) to the slave command sequencer SCS1, thread 206, is transferred (or copied) to the slave command sequencer SCS2, and so on up to the last thread 208, which is transferred (or copied) to the slave command sequencer SCSN as shown. Although not shown, additional threads may be included, such as THD 3 transferred (or copied) to SCS3, THD 4 transferred (or copied) to SCS4, and so on up to N+1 separate threads.

Execution by the MCS 102 is the same or similar to the previously described. Again, the MCS 102 executes the instructions 1, 2, and 3 in order, and then, when it encounters the thread links 210, simultaneously prompts the slave command sequencers SCS0-SCSN to begin executing the corresponding threads THD 0-N. The MCS 102 waits until all of the active threads are completed before executing the last instruction 4 before stopping as depicted as the implicit synchronization arrow 212.

Figure 4:
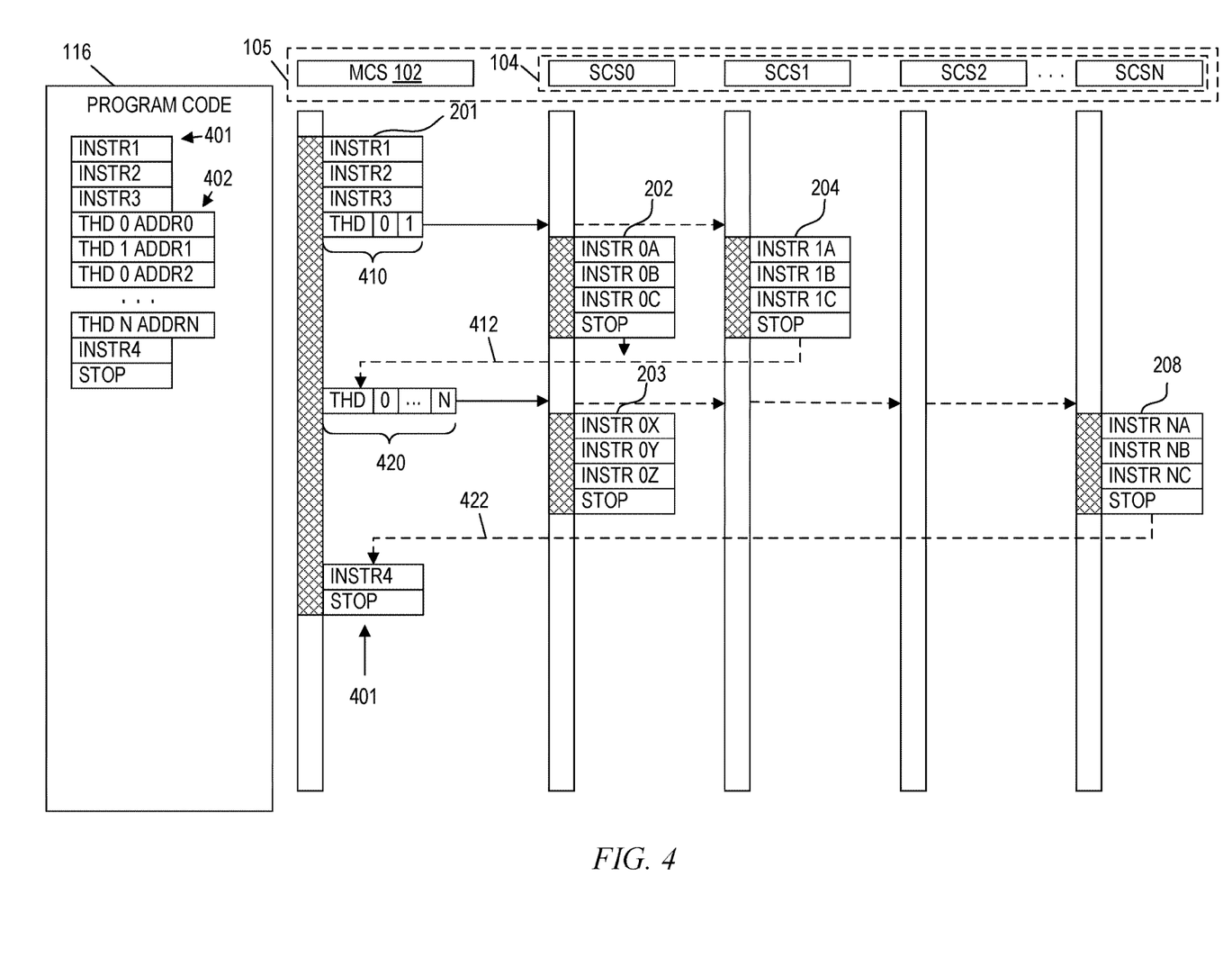
FIG. 4 is an illustration of program code including pointers to one or more thread instruction sets including reinvocation of one thread instruction set according to another embodiment of the present disclosure.

FIG. 4 is an illustration of program code 116 including pointers to one or more thread instruction sets including reinvocation of one thread instruction set according to another embodiment of the present disclosure. In this case the program code 116 includes an instruction set 401 including the set of instructions 1, 2, 3, and 4 followed by a STOP instruction in a similar manner as previously described for FIG. 3. For the instruction set 401, interposed between instructions 3 and 4 are multiple thread pointers 402 each pointing to a corresponding one of the threads 202 and 204, a reinvocation of the thread 202, shown as reinvocation thread 203, followed by any number of pointers up to a pointer to thread 208 previously described. The thread pointers 402 includes a pointer to thread 202 (THD 0) at address ADDR0, a pointer to thread 204 (THD 1) at the address ADDR1, a pointer to reinvocation thread 203 (THD 0) at address ADDR2, and so on up to a pointer to THD N at an address ADDRN. The reinvocation thread THD 0 203, which is the second invocation of THD 0 202, may have the same instructions at the same address, or may have different instructions as shown, or instructions OX, OY, and OZ, followed by a STOP instruction.

The thread pointers 402 are replaced within the program code 102 of the MCS 102 with first thread links 410 and second thread links 420. Thread 202 is transferred (or copied) to the slave command sequencer SCS0, and thread 204 is transferred (or copied) to the slave command sequencer SCS1. In this case the MCS 102 executes the instructions 1, 2, and 3 in order, and then, when it encounters the thread links 410, simultaneously prompts the slave command sequencers SCS0 and SCS1 to begin executing the corresponding threads 202 and 204 in parallel. The MCS 102 waits until the threads 202 and 204 are completed as indicated by implicit synchronization arrow 412, and then encounters the thread links 420. The operands of the reinvocation thread 203 are loaded into the slave command sequencers SCS0, and remaining threads up to the last thread 208 are loaded into consecutive slave command sequencers up to SCSN. The MCS 102 simultaneously prompts the slave command sequencers SCS0 and SCSN and any other SCSs 104 loaded with threads to begin executing the corresponding threads 203 to 208 in parallel. The MCS 102 waits until each of the threads 203 to 208 are completed as indicated by implicit synchronization arrow 422, before executing the last instruction 4 and stopping. Although not explicitly shown, the THREAD instructions with pointers may be combined into a single extended THREAD instruction which includes pointers to all threads, e.g., THREAD ADDR0, ADDR1, ADDR2, . . . , ADDRN."

Figure 5:
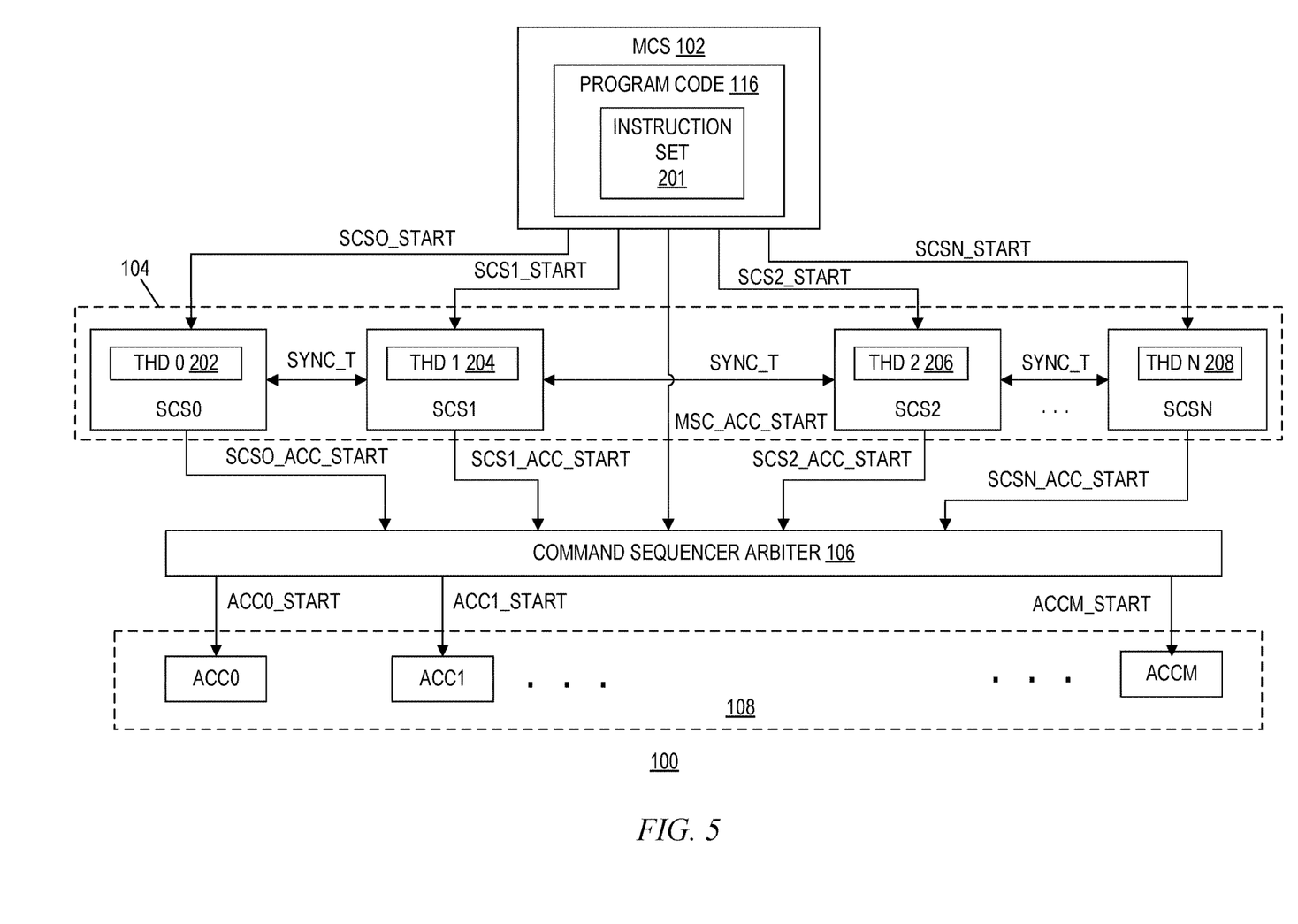
FIG. 5 is a more detailed block diagram of a portion of the multiple command sequencer processing system of FIG. 1 from the MCS to the accelerators according to one embodiment of the present disclosure.

FIG. 5 is a more detailed block diagram of a portion of the multiple command sequencer processing system 100 from the MCS 102 to the accelerators 108 according to one embodiment of the present disclosure. The MCS 102 is shown including the program code 116 with the instruction set 201 of FIG. 2 including inline threads with thread identifiers THD 0-THD N, which are distributed to the slave command sequencers SCS0-SCSN, respectively. The MCS 102 and each of the slave command sequencers SCS0-SCSN interface the command sequencer arbiter 106 to arbitrate for, and to interface with, a corresponding one of the accelerators 108. After the thread instruction sets are distributed, the MCS 102 asserts a signal MSC_ACC_START to arbitrate for one of the accelerators 108, and once the MCS 102 is interfaced with one of the accelerators 108, it begins executing the program code 116. Once it encounters the thread links 210, the MCS 102 prompts each of the slave command sequencers SCS0-SCSN through corresponding start signals SCS0_START, SCS1_START, SCS2_START, . . . , SCSN_START. The slave command sequencers SCS0-SCSN then assert corresponding arbitration request signals SCS0_ACC_START, SCS1_ACC_START, SCS2_ACC_START, . . . , SCSN_ACC_START to arbitrate for corresponding accelerators 108. Once a command sequencer 105 is interfaced with one of the accelerators 108, it asserts a corresponding ACC start signal, shown as ACC0 START, ACCE_START, . . . , ACCM_START, to begin executing its corresponding thread. The slave command sequencers SCS0-SCSN may synchronize operation with each other via a synchronization trigger (SYNC_T) signal.

Figure 6:
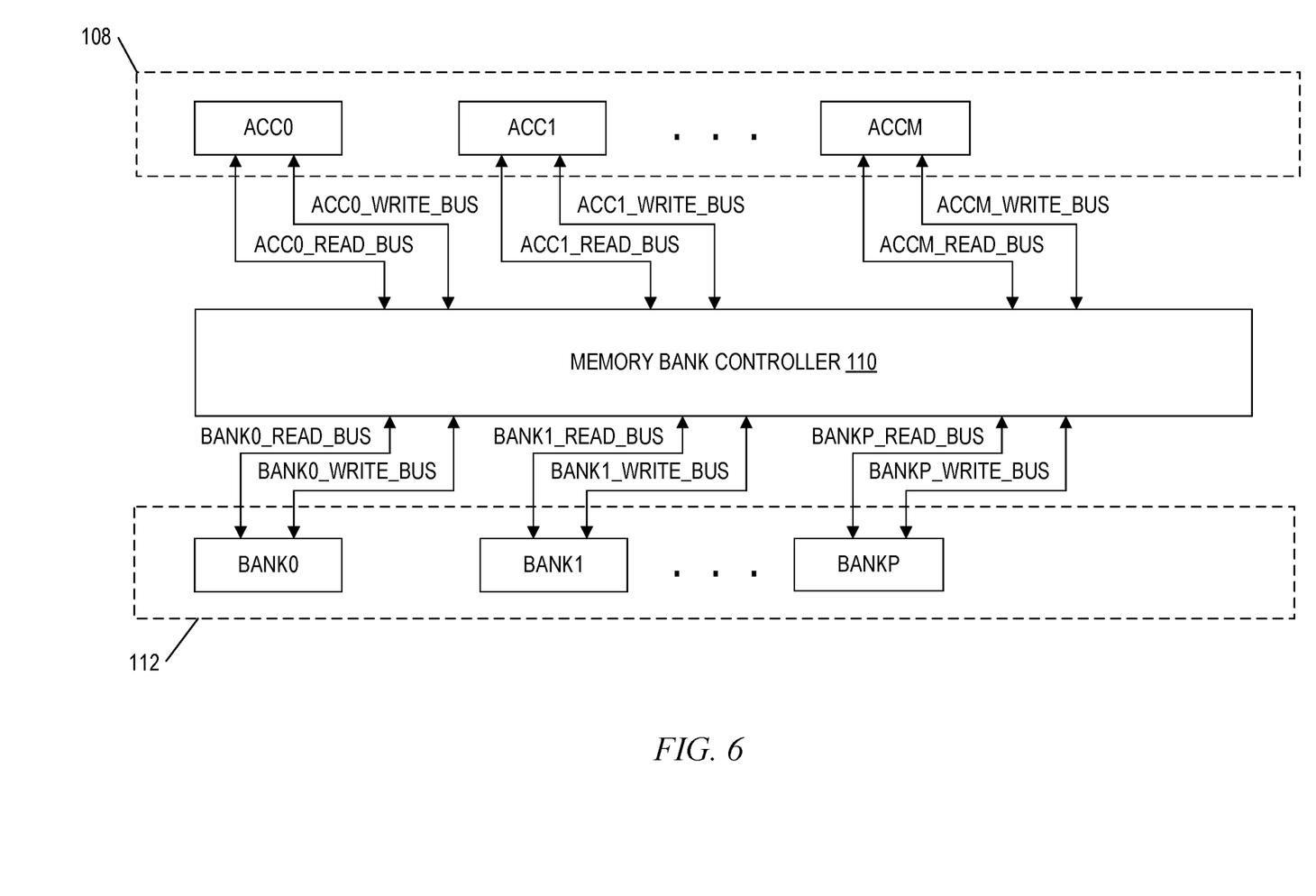
FIG. 6 is a more detailed block diagram of the memory bank controller interfaced with the accelerators and the memory banks of FIG. 1.

FIG. 6 is a more detailed block diagram of the memory bank controller 110 interfaced with the accelerators 108 and the memory banks 112. Each of the M+1 accelerators ACC0-ACCM is interfaced with the memory bank controller 110 via a corresponding read bus ACCx_READ_BUS and a corresponding write bus ACCx_WRITE_BUS, in which "x" ranges from 0 to M corresponding to the individual accelerators. Similarly, each of the P memory banks BANK0-BANKM is interfaced with the memory bank controller 110 via a corresponding read bus BANKy_READ_BUS and a corresponding write bus BANKy_WRITE_BUS, in which "y" ranges from 0 to P corresponding to the individual memory banks. The memory bank controller 110 operates as an arbiter to couple one or more of the memory banks 112 to each of the accelerators 108 and as a controller to each of the memory banks 112. The memory bank controller 110 may include a switched matrix configuration or multiple multiplexors or the like to provide simultaneous access of one or more of the memory banks 112 to each of the accelerators 108 during operation.

Figure 7:
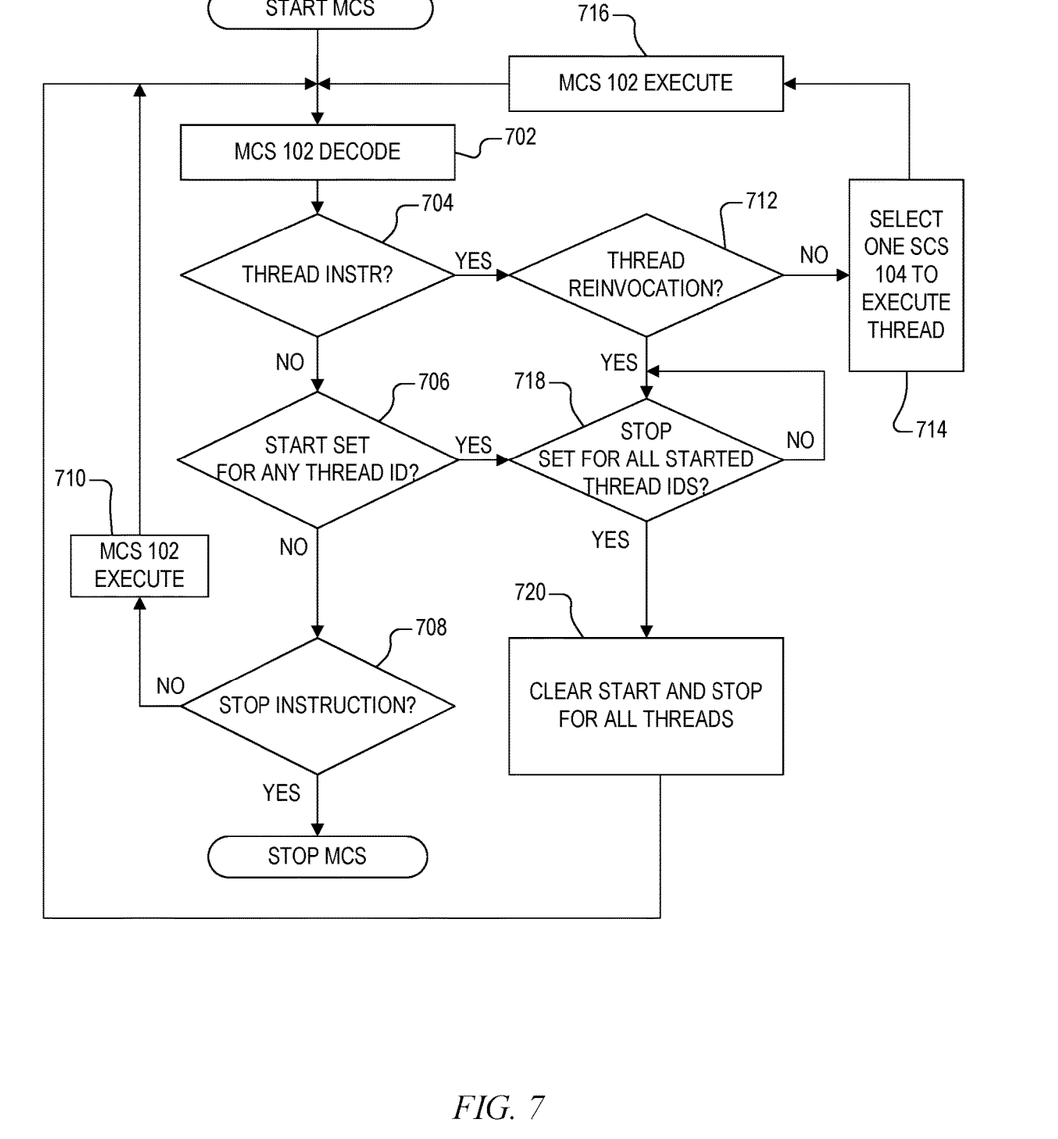
FIG. 7 is a flowchart diagram illustration operation of the MCS of FIG. 1 during execution of the program code according to one embodiment of the present disclosure.

FIG. 7 is a flowchart diagram illustration operation of the MCS 102 during execution of the program code 116 according to one embodiment of the present disclosure. At first block 702 the MCS 102 begins decoding the instructions of the program 116, such as, for example, one of the instruction sets 201, 301, or 401. At next block 704 it is queried whether the first or next instruction is a thread instruction or a pointer to a thread instruction set, such as, for example, any of the threads THD 0-N previously described. If not a thread instruction, then operation advances to block 706 in which it is queried whether any threads have been started, as indicated by a start set bit for any thread indicated by its corresponding thread ID. If no threads have been started, operation advances to next block 708 in which it is queried whether the instruction is a STOP instruction. If not a STOP instruction, then operation advances to block 710 to execute the MCS instruction, and then loops back to block 702 to continue decoding and executing instructions.

Referring back to block 704, if the instruction is a thread instruction, then operation advances instead to block 712 in which it is queried whether the thread instruction is a thread reinvocation of a previously invoked thread instruction set, such as, for example, the reinvocation thread 203. If not a thread reinvocation, then operation advances to block 714 in which the MCS 102 selects one of the SCSs 104 to execute the thread instruction set as further described herein. Operation then advances to block 716 to continue MCS execution, in which the MCS 102 either asserts a start signal to invoke the SCS 104 selected at block 714, or otherwise asserts one or more start signals to invoke each of multiple SCSs 104 to executed multiple thread instructions at the same time. For example, the SCSs 104 loaded with the threads 202-208 may each be started one at a time when selected and invoked, or the SCSs 104 may first be loaded with multiple threads 202-208, and after all threads are loaded, the MCS 102 then simultaneously invokes the loaded SCSs 104 at the same time. After block 714, operation loops back to block 702 to continue MCS decode and execution as previously described. Operation loops between blocks 702 and 716 to select and invoke one or more of the SCSs 104 to execute one or more thread instruction sets, such as, for example, the threads 202, 204, 206, . . . , 208.

Referring back to block 706, if the start bit for any thread has been set (meaning at least one thread is active), then operation advances instead to block 718 in which it is queried whether a stop bit has been set for all thread instruction sets that have been started. If there is at least one active thread as determined at block 718, then operation loops at block 718 until the stop bit of each started thread instruction set is set, which corresponds with the implicit synchronization indicated by arrow 212. Referring back to block 712, if the thread instruction is a thread reinvocation of a previously invoked thread instruction set, then operation advances to block 718 to wait until all of the started thread instruction sets have completed. Operation loops at block 718 as previously described until all active thread instruction sets have completed, and then operation advances to block 720 in which the start and stop bits for all thread instruction sets are cleared. After block 720, then operation loops back to block 702 to continue MCS decode and execution. When the STOP instruction is encountered at block 708, operation is completed.

As an example, when executing the instruction set 201, the MCS 102 loops between blocks 702 and 710 to execute the first three instructions 1, 2, and 3. Then when the thread instruction set 202 is encountered, the MCS 102 loops between blocks 702 and 716 to select and invoke multiple SCSs 104 to begin execution of the multiple threads 202, 204, 206, . . . , 208. When the instruction 4 is first encountered at block 704, and after determining at block 706 that multiple threads have been started, the MCS 102 loops at block 718 until all of the threads have completed. After the threads have completed, operation loops back to block 702 and then to block 710 to execute instruction 4 before completing operation.

Operation of the instruction set 301 is substantially the same as operation of the instruction set 201 in which block 704 detects an instruction thread set for each of the multiple thread pointers 302.

Operation of the instruction set 401 is different based on reinvocation of a thread. In this case, when the pointer to reinvocation thread 203 at ADDR2 is encountered, operation advances to block 712 and then to block 718 to wait while looping until the threads 202 and 204 have completed. When the stop bits have been set for both of the threads 202 and 204 indicating the implicit synchronization arrow 412, then after the start and stop bits have been cleared at block 720, operation loops back to block 702 and eventually to block 712 again. At this point, however, the MCS 102 advances to block 714 to select and invoke the same slave command sequencer SCS0 to begin executing the reinvocation thread 203. Operation loops between blocks 702 to 716 to select and invoke SCSs 104 to execute the remaining thread instruction sets up to the thread 208. Then operation eventually advances to and loops at block 718 to wait until each of the active threads have completed execution corresponding to the implicit synchronization 422. After the second set of threads are completed, operation loops back to block 702 and then to block 710 to execute instruction 4 before completing operation.

Figure 8:
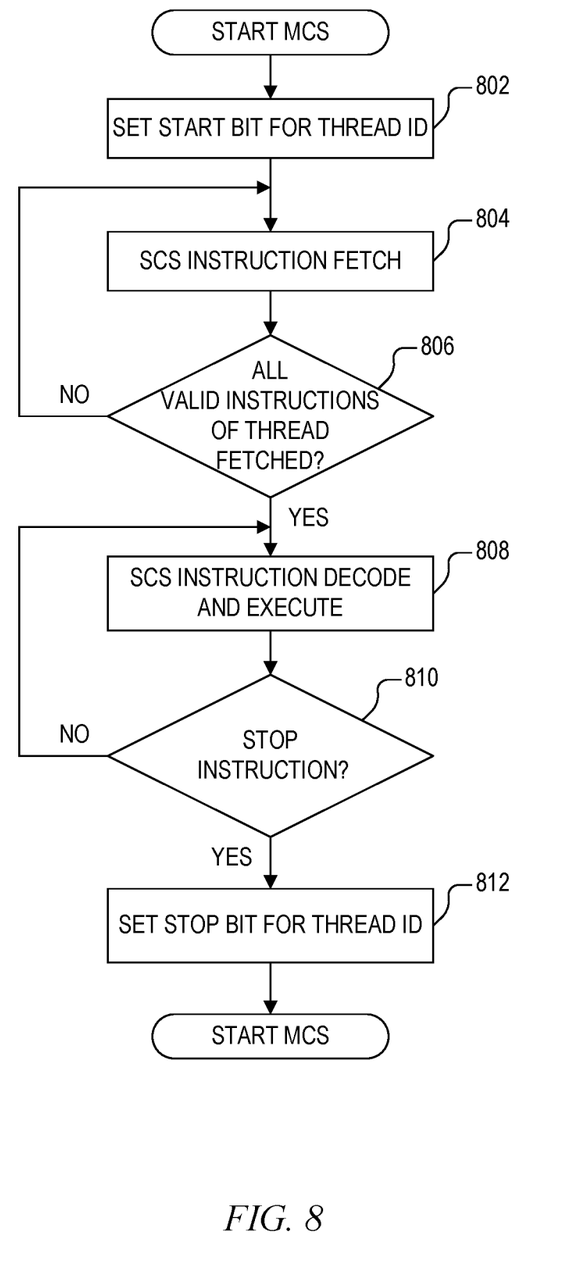
FIG. 8 is a flowchart diagram illustrating operation of any one of the slave command sequencers of FIG. 1 for executing a thread instruction set after being invoked by the MCS according to one embodiment of the present disclosure.

FIG. 8 is a flowchart diagram illustrating operation of any one of the slave command sequencers 104 for executing a thread instruction set after being invoked by the MCS 102 at block 714 of FIG. 7 according to one embodiment of the present disclosure. At first block 802, the start bit for the identified thread based on thread ID is set. At next block 804, the SCS 104 uses the address passed by the MCS 102 to access the thread instructions. Operation loops between the blocks 804 and 806 until all of the valid thread instructions are loaded into the memory of the SCS 104. Then at next block 808, the SCS 808 decodes and executes the first or next thread instruction in the set. After execution of each thread instruction, operation advances to block 810 to query whether the next thread instruction is a STOP instruction. If not, operation loops back to block 808 to decode and execute the next thread instruction. When the STOP instruction is encountered at block 810, operation advances instead to block 812 in which the stop bit for the thread instruction set identified by thread ID is set, and operation is completed.

Although not specifically shown in FIGS. 7 and 8, a synchronization (SYNC) function may be implemented between active threads which enables one thread to wait until another specified thread reaches a specific point in code, or to enable one thread to wait until another specified thread or group of threads have completed operation.

Figure 9:
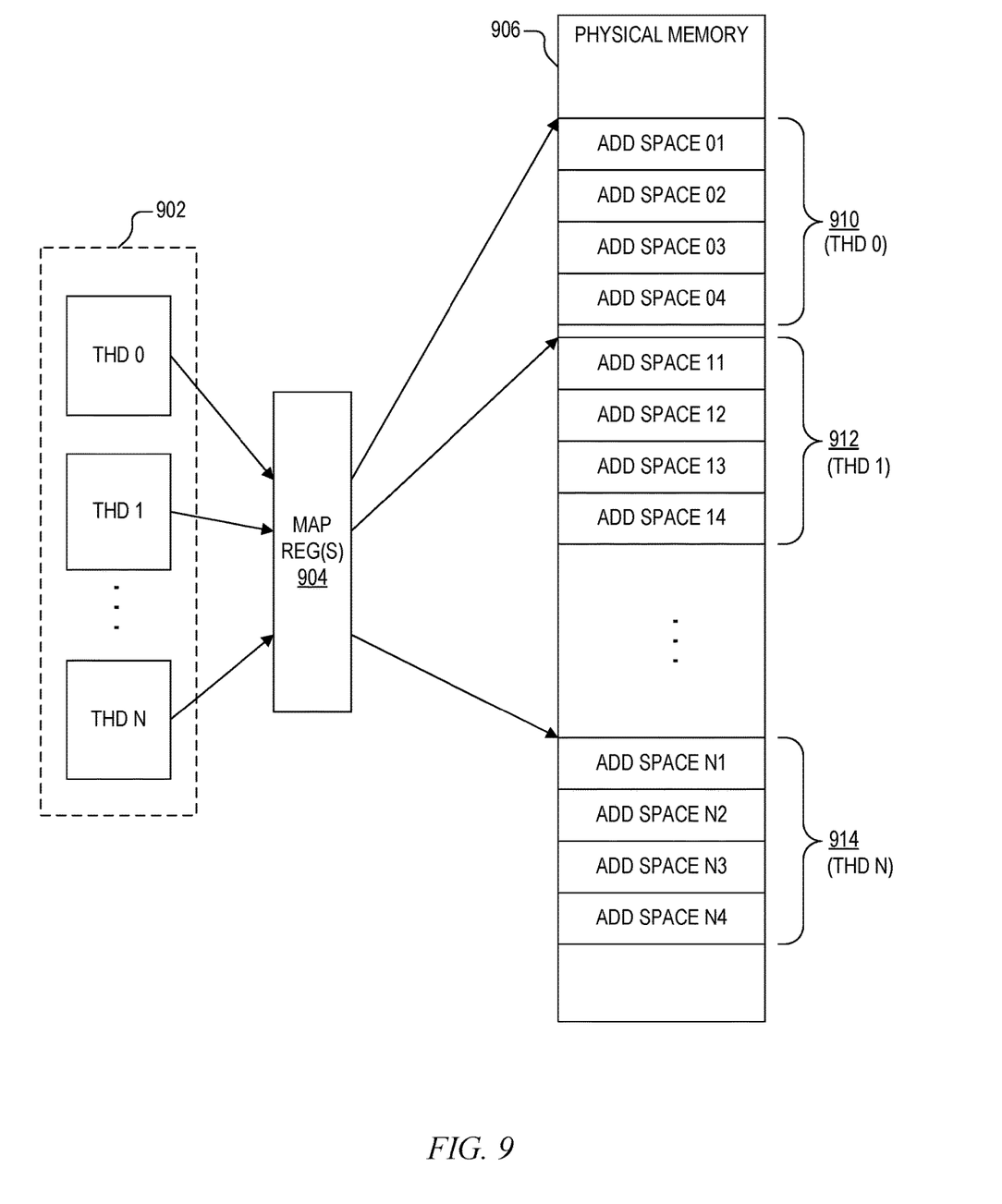
FIG. 9 is a simplified block diagram illustrating logical to physical memory mapping according to one embodiment of the present disclosure.

FIG. 9 is a simplified block diagram illustrating logical to physical memory mapping according to one embodiment of the present disclosure. The logical address space is limited to L KB, yet the amount of memory space needed for any one or more of the threads may be greater than L KB. A set of N+1 threads 902 with thread IDs THD 0-THDN executed by the SCSs 104 each provide logical addresses to access physical memory space 906 via at least one MAP register, shown as MAP REG(S) 904. The logical addresses of multiple threads may be the same yet identified separately by the corresponding thread ID. The MAP register 904 performs logical to physical mapping for each thread, so that THD 0 accesses a first memory space 910, THD 1 accesses a second memory space 912, and so on up to THD N, which accesses a last memory space 914. In one embodiment, each of the memory spaces 910, 912, . . . , 914 (912-914) may be L KB. In another embodiment as shown, each of the memory spaces 912-914 may further be subdivided into separate address spaces, such as 4 separate address spaces in which each address space is L KB. As shown, the memory space 910 includes 4 address spaces 01, 02, 03, and 04, the memory space 912 includes 4 address spaces 11, 12, 13, and 14, and so on up to the memory space 914, which includes 4 address spaces N1, N2, N3, and N4. In a more specific embodiment, L may be 32 so that each address space is 32 KB, although alternative memory sizes are contemplated for different configurations.

Although not specifically shown, lock functionality may be implemented to to ensure that memory space is protected based on thread context so that one thread does not overwrite data and information of another thread. For example, lock functionality allows thread THD 0 to have write access only to the memory space 910 and prevents it from overwriting data in memory spaces 912 to 914. In one embodiment, each thread only has read access to its own memory space. In another embodiment, each thread may have read access to the memory space of any other thread.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive logic or negative logic may be used in various embodiments in which the present invention is not limited to specific logic polarities, device types or voltage levels or the like. For example, logic states, such as logic low and logic high may be reversed depending upon whether the pin or signal is implemented in positive or negative logic or the like. In some cases, the logic state may be programmable in which the logic state may be reversed for a given logic function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A processing system, comprising:
a memory that stores program code comprising a plurality of instruction threads sequentially listed in the program code;
a plurality of command sequencers comprising a master command sequencer and a plurality of slave command sequencers, wherein the master command sequencer executes the program code including distributing the plurality of instruction threads for parallel execution among the plurality of slave command sequencers;
a plurality of accelerators available to the plurality of command sequencers for parallel execution;
a plurality of memory banks simultaneously available to the plurality of accelerators; and
a command sequencer arbiter that arbitrates among the master command sequencer and the plurality of slave command sequencers for accessing the plurality of accelerators, wherein the command sequencer arbiter comprises one of a switch matrix or a plurality of multiplexors that enables simultaneous access of each of the plurality of command sequencers with a corresponding one of the plurality of accelerators.

2. The processing system of claim 1, wherein the plurality of instruction threads are provided inline within the program code.

3. The processing system of claim 1, wherein the plurality of instruction threads are accessed by thread pointers provided inline within the program code.

4. The processing system of claim 1, wherein the master command sequencer performs implicit synchronization by waiting for completion of execution of the plurality of instruction threads before proceeding with execution of the program code.

5. The processing system of claim 1, wherein a total number of the plurality of accelerators is at least a total number of a plurality of command sequencers.

6. The processing system of claim 1, further comprising at least one map register that enables logical to physical address mapping for each of the plurality of instruction threads.

7. The processing system of claim 6, wherein each of the plurality of instruction threads is distinguished by a corresponding thread identifier so that each instruction thread may use common logical addresses while accessing independent physical address spaces.

8. The processing system of claim 7, wherein each of the independent physical address spaces is further subdivided into multiple separate address spaces.

9. The processing system of claim 1, wherein the plurality of accelerators comprise a plurality of heterogenous specialized hardware accelerators in which each of the plurality of heterogenous specialized hardware accelerators performs a corresponding one of a plurality of different operations.

10. The processing system of claim 1, wherein the plurality of command sequencers supports synchronized functionality between multiple thread instruction sets which enables a thread instruction set to wait until another thread instruction set reaches a specific point in code.

11. The processing system of claim 1, wherein the plurality of command sequencers supports synchronized functionality between multiple thread instruction sets which enables a thread instruction set to wait until a specific thread instruction set or combination of thread instruction sets completes.

12. A processing system, comprising:
a memory that stores program code comprising a plurality of instruction threads sequentially listed in the program code;
a plurality of command sequencers comprising a master command sequencer and a plurality of slave command sequencers, wherein the master command sequencer executes the program code including distributing the plurality of instruction threads for parallel execution among the plurality of slave command sequencers;
a plurality of accelerators available to the plurality of command sequencers for parallel execution; and
a plurality of memory banks simultaneously available to the plurality of accelerators,
wherein the plurality of instruction threads includes a reinvocation instruction thread that is assigned to one of the plurality of slave command sequencers, wherein the master command sequencer performs implicit synchronization by waiting for completion of a first execution of the reinvocation instruction thread before instigating a second execution of the reinvocation instruction thread.

13. The processing system of claim 12, wherein the plurality of instruction threads are provided inline within the program code.

14. The processing system of claim 12, wherein the plurality of instruction threads are accessed by thread pointers provided inline within the program code.

15. A processing system, comprising:
a memory that stores program code comprising a plurality of instruction threads sequentially listed in the program code;

a plurality of command sequencers comprising a master command sequencer and a plurality of slave command sequencers, wherein the master command sequencer executes the program code including distributing the plurality of instruction threads for parallel execution among the plurality of slave command sequencers;

a plurality of accelerators available to the plurality of command sequencers for parallel execution;

a plurality of memory banks simultaneously available to the plurality of accelerators; and a memory bank arbiter that arbitrates among the plurality of accelerators for accessing the plurality of memory banks, wherein the memory bank arbiter comprises at least one of a switch matrix or a plurality of multiplexors that enable simultaneous access of each of the plurality of accelerators to a corresponding at least one of the plurality of memory banks.

16. The processing system of claim 15, wherein a number of the plurality of memory banks is at least twice a total number of the plurality of accelerators.

17. The processing system of claim 16, wherein the memory bank arbiter enables simultaneous access of each of the plurality of accelerators to at least two of the plurality of memory banks.

18. The processing system of claim 15, wherein the plurality of instruction threads are provided inline within the program code.

19. The processing system of claim 15, wherein the plurality of instruction threads are accessed by thread pointers provided inline within the program code.

20. The processing system of claim 15, wherein the master command sequencer performs implicit synchronization by waiting for completion of execution of the plurality of instruction threads before proceeding with execution of the program code.

21. The processing system of claim 15, wherein the plurality of accelerators comprise a plurality of heterogenous specialized hardware accelerators in which each of the plurality of heterogenous specialized hardware accelerators performs a corresponding one of a plurality of different operations.

22. The processing system of claim 15, wherein the plurality of command sequencers supports synchronized functionality between multiple thread instruction sets which enables a thread instruction set to wait until another thread instruction set reaches a specific point in code.

23. The processing system of claim 15, wherein the plurality of command sequencers supports synchronized functionality between multiple thread instruction sets which enables a thread instruction set to wait until a specific thread instruction set or combination of thread instruction sets completes.

* * * * *